(12) United States Patent
Lv

(10) Patent No.: US 10,172,504 B2
(45) Date of Patent: Jan. 8, 2019

(54) GLASS-WIPING DEVICE

(71) Applicant: ECOVACS ROBOTICS CO., LTD., Jiangsu (CN)

(72) Inventor: Xiaoming Lv, Jiangsu (CN)

(73) Assignee: ECOVACS ROBOTICS CO., LTD., Suzhou, Jiangsu (CN)

( * ) Notice: Subject to any disclaimer, the term of this patent is extended or adjusted under 35 U.S.C. 154(b) by 539 days.

(21) Appl. No.: 14/390,617

(22) PCT Filed: Jan. 16, 2013

(86) PCT No.: PCT/CN2013/070527
§ 371 (c)(1),
(2) Date: Nov. 20, 2014

(87) PCT Pub. No.: WO2013/149504
PCT Pub. Date: Oct. 10, 2013

(65) Prior Publication Data
US 2015/0113752 A1 Apr. 30, 2015

(30) Foreign Application Priority Data
Apr. 5, 2012 (CN) .......................... 2012 1 0097812

(51) Int. Cl.
*A47L 1/02* (2006.01)
*B60S 1/04* (2006.01)
*H01H 3/16* (2006.01)

(52) U.S. Cl.
CPC ............. *A47L 1/02* (2013.01); *A47L 2201/04* (2013.01); *B60S 1/0455* (2013.01); *H01H 3/16* (2013.01)

(58) Field of Classification Search
CPC .......... A47L 1/02; A47L 2201/01; B08B 1/04
(Continued)

(56) References Cited

U.S. PATENT DOCUMENTS 4,257,138 A * 3/1981 Clements ................... A47L 1/02
15/103
4,870,713 A * 10/1989 Raynor ................. B60R 1/0612
15/250.003
(Continued)

FOREIGN PATENT DOCUMENTS

| CN | 101152062 | 4/2008 |
| CN | 201463823 | 5/2010 |

(Continued)

OTHER PUBLICATIONS

Office Action issued for corresponding JP Application No. 20015-503731; 3 pages.

(Continued)

*Primary Examiner* — Michael Jennings
(74) *Attorney, Agent, or Firm* — Timothy S. Westby; Porter Hedges LLP

(57) ABSTRACT

A glass-wiping device comprises a machine body (1) and a control unit. The machine body (1) is provided with an edge detection unit (100), the edge detection unit (100) comprises a sensor switch (101, 101') and an action element (102). The action element (102) is provided at a lower end thereof with a contact leg (1021, 1021') that presses against the surface of a glass (200). When the contact leg (1021, 1021') leaves the surface of the glass (200), the action element (102) correspondingly generates a displacement and triggers the sensor switch (101, 101'); the sensor switch (101, 101') transmits a switch signal to the control unit; the control unit controls, on the basis of the switch signal, the glass-wiping device to cease running or to change the running direction. The glass-wiping device has a simple structure, reduced costs, high sensitivity and great controllability, and effectively implements the detection of the edge of a plate glass.

9 Claims, 2 Drawing Sheets

(58) Field of Classification Search
USPC .............. 15/250.13, 250.17, 319, 339, 340.1
See application file for complete search history.

(56) References Cited

U.S. PATENT DOCUMENTS

| | | | | |
|---|---|---|---|---|
| 5,522,112 | A * | 6/1996 | Tiffany, III | ............ B60R 1/0602 |
| | | | | 15/250.01 |
| 5,634,234 | A * | 6/1997 | Allain | ................... B60R 1/0602 |
| | | | | 15/250.003 |
| 5,924,161 | A * | 7/1999 | Miller | ................... B60R 1/0602 |
| | | | | 15/250.003 |
| 6,546,590 | B2 * | 4/2003 | Waters | ................. B60R 1/0602 |
| | | | | 15/250.003 |
| 6,809,490 | B2 * | 10/2004 | Jones | ................... G05D 1/0219 |
| | | | | 318/568.12 |
| 7,402,974 | B2 * | 7/2008 | Jeon | ........................ G05D 1/021 |
| | | | | 180/65.1 |
| 8,239,992 | B2 * | 8/2012 | Schnittman | .............. A47L 11/34 |
| | | | | 15/319 |
| 2004/0117064 | A1 * | 6/2004 | McDonald | .............. A47L 9/009 |
| | | | | 700/245 |
| 2005/0137749 | A1 * | 6/2005 | Jeon | ..................... G05D 1/0225 |
| | | | | 700/245 |
| 2006/0053580 | A1 * | 3/2006 | Woo | ........................ A47L 9/009 |
| | | | | 15/319 |
| 2006/0174840 | A1 | 8/2006 | Rafailovich | |
| 2007/0039293 | A1 * | 2/2007 | Baek | ...................... A47L 9/1472 |
| | | | | 55/354 |
| 2008/0052867 | A1 * | 3/2008 | Park | ........................ A47L 9/009 |
| | | | | 15/319 |
| 2011/0004339 | A1 * | 1/2011 | Ozick | ....................... A47L 5/30 |
| | | | | 700/245 |

FOREIGN PATENT DOCUMENTS

| | | |
|---|---|---|
| CN | 202083959 | 12/2011 |
| CN | 202458200 | 10/2012 |
| CN | 202537389 | 11/2012 |
| JP | 57087562 | 6/1982 |
| JP | 4084924 | 3/1992 |
| JP | H05100742 | 4/1993 |
| JP | 2007307354 | 11/2007 |
| JP | 2009118995 | 6/2009 |
| JP | 2009219831 | 10/2009 |
| KR | 20060105831 | 10/2006 |

OTHER PUBLICATIONS

Extended Search Report for European Application No. 13772811.9 dated Oct. 14, 2015 (7 pgs.).

Search Report and Written Opinion for International Application No. PCT/CN2013/070527 dated Apr. 25, 2013 (8 pgs.).

* cited by examiner

GLASS-WIPING DEVICE

BACKGROUND

Field of the Invention

The present invention relates to the technical field of the manufacture of small household electric appliances, and in particular relates to a glass-wiping device.

Background of the Invention

The glass-wiping robot has been widely used for its small and exquisite structure and flexible control. The method adopted by all the glass-wiping devices in the prior art to detect the glass frame and edge is as follows: first, performing a wavelet decomposition on an acquired image to obtain a histogram of the low frequency part of the image, and determining a threshold value of image blurring by a wavelet analysis on the histogram; then, defining a new membership function according to the threshold, and converting the image into an equivalent fuzzy property plane to conduct an enhancement mathematical operation and obtain the enhanced image; finally, completing edge detection and identification for the enhanced image. This detection manner is relatively complicated in process and needs a relatively high requirement for the hardware cost of the glass-wiping device. Further, all the glass-wiping devices available in the market have no edge detection function, and in particular for a plate glass having no frame, have a risk of falling off.

SUMMARY

To overcome the deficiencies in the prior art, the present invention aims to provide a glass-wiping device that has a simplified structure, a reduced cost, a high sensitivity, and a great controllability and can effectively implements the detection of the edges of a plate glass.

The technical object of the present invention is realized through the following technical solutions:

A glass-wiping device is provided, which comprises a machine body and a control unit. The machine body is provided with an edge detection unit comprising a sensor switch and an action element. A contact leg is provided at a lower end of the action element and presses against a surface of a glass. When the contact leg leaves the surface of the glass, the action element correspondingly generates a displacement and triggers the sensor switch. The sensor switch transmits a switch signal to the control unit, and based on the switch signal, the control unit controls the glass-wiping device to cease running or to change the running direction.

According to requirements, the sensor switch is a travel switch, and the action element is a connecting rod. Or, the sensor switch is a Hall sensor, and the action element comprises a magnetic element correspondingly provided thereon. Or the sensor switch is a magnetron, and the action element comprises a magnetic element correspondingly provided thereon.

Specifically, the edge detection unit further comprises a supporting body in which a step through-hole is provided. The action element is provided through this step through-hole, and has a length greater than the height of the supporting body. An upper part of the action element is limited on the external end surface of the supporting body by a position-limiting part. A spring is fitted around the action element, and is pressed against between the step through hole and the contact leg.

The travel switch is provided within a shell of the glass-wiping device. Or, the Hall sensor is provided on the supporting body. Or, the magnetron is provided on the supporting body.

For the convenience of the limitation of the travel of the up/down operation of the action element in the supporting body, the limiting element is a buckle fixed on the connecting rod.

To facilitate the retraction of the contact leg when the glass-wiping device retreats, according to different requirements, the contact leg has an end-surface shape that is a semi-circular or arc shape or a trapezium shape having a guiding slope.

For the convenience of processing, the supporting body and the shell on the edge of the machine body are provided as an integral piece.

According to actual requirements, the glass-wiping device has an external shape that varies. The external shape of the machine body is a circular, square, rectangle, oval or irregular shape.

To perform an accurate detection on the edge of plate glass and improve the sensitivity and precision of the detection system, a plurality of the edge detection units are provided, and the sensor switch in each of the edge detection units is connected to the control unit.

To timely detect and thus avoid the edge of glass promptly, the edge detection unit is provided at an edge of the machine body of the glass-wiping device.

In conclusion, because of simplified structure, reduced costs and great controllability, the present invention can effectively realize the detection on the edge of plate glass.

The present invention is further described in detail with reference to the attached drawings and the embodiments.

DETAILED DESCRIPTION

First Embodiment

Figure 1:
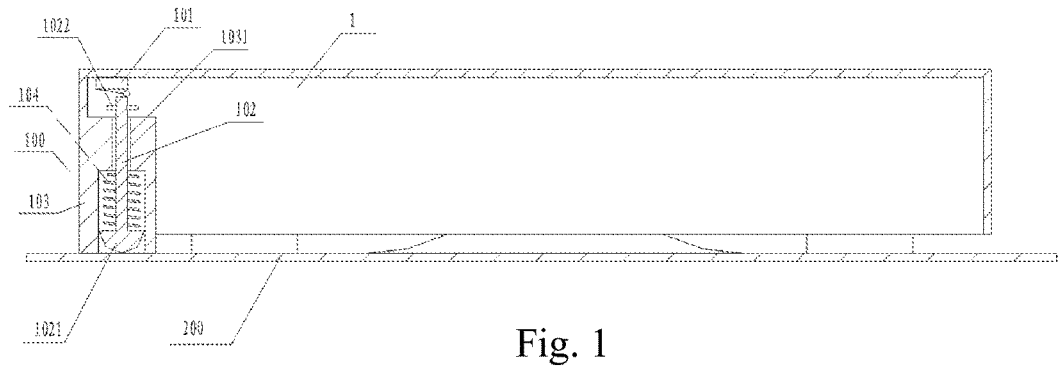
FIG. 1 is one structure diagram of the first embodiment of the present invention.

FIG. 1 is one structure diagram of the first embodiment of the present invention. As shown in FIG. 1, the present invention provides a glass-wiping device comprising a machine body 1 and a control unit. The machine body refers to the integral structure of the glass-wiping device including a suction mechanism, a running mechanism, an actuating mechanism and the like. The control unit refers to an integral control unit provided on the glass-wiping device to control the respective operations of the mechanisms in the glass-wiping device as well as the coordination operations between these mechanisms. An edge detection unit 100 is provided on the edge of the machine body 1, and comprises a sensor switch 101 and an action element 102. The action element 102 is provided at a lower end thereof with a contact leg 1021 that presses against the surface of a glass. When the contact leg 1021 leaves the surface of the glass 200, the action element 102 correspondingly generates a displacement and triggers the sensor switch 101. The sensor switch 101 transmits a switch signal to the control unit, and the control unit controls, based on the switch signal, the glass-wiping device to cease running or to change the running direction. According to requirements, the sensor switch 101 is a travel switch, and the action element 102 is a connecting rod.

Specifically, the edge detection unit 100 also comprises a supporting body 103 in which a step through-hole 1031 is provided, wherein the action element 102 is provided through the step through-hole 1031, and the length of the action element 102 is greater than the height of the supporting body. The movement in up/down directions of the action element 102 is limited by the step through-hole 1031. The upper part of the action element 102 is limited on the external end surface of the supporting body 103 by a position-limiting part 1022, so that the travel of the up/down movement of the action element 102 in the supporting body 103 is limited. The position-limiting part 1022 is a buckle fixed on the upper part of the action element 102. A spring 104 is also fitted around the action element 102. When the contact leg 102 presses against the glass, the spring 104 is compressed and pressed against between the step through-hole 1031 and the contact leg 1021.

To facilitate the refraction of the contact leg when the glass-wiping device retreats, the end surface of the contact leg 1021 is typically designed as a semi-circular shape. According to different requirements or the difficulty level of processing, the end surface of the contact leg 1021 may also be designed as an arc shape or a trapezoid shape with guiding slopes. To reduce friction force, the contact leg 1021 is made of smooth and wearable metal or hard rubber material.

For the convenience of processing and reduced costs, the supporting body 103 and the shell on the edge of the machine body 1 are provided as an integral piece. The step through-hole 1031 is directly dug in the machine body 1. If required, they can also be separately provided such that the supporting body 103 as a separate part is assembled together with the machine body 1.

According to actual requirements, the external shape of the glass-wiping device may vary in various applications. Therefore, the external shape of the machine body 1 may be designed in a circular, square, rectangle, oval or irregular shape. To perform an accurate detection on the edge of a plate glass and improve the sensitivity and precision of the glass-wiping device, a plurality of edge detection units 100 are provided, and the sensor switch 101 in each of the edge detection units 100 is connected to the control unit. For the machine body 1 having a different external shape, the plurality of edge detection units 100 may be provided on different positions. For example, when the machine body 1 has s square or rectangle shape, four edge detection units 100 may be respectively provided on four vertex angles of the machine body. When the machine body 1 has a circular or oval shape, four or more edge detection units 100 may be evenly distributed on the circumference of the circular or oval shape. When the machine body 1 has an irregular shape, four or more edge detection units 100 may be, for example, provided on the forward end and backward end in the movement direction of the glass-wiping device, or for example, provided on the left end and right end in the general direction of the overall shape of the glass-wiping device.

Figure 2:
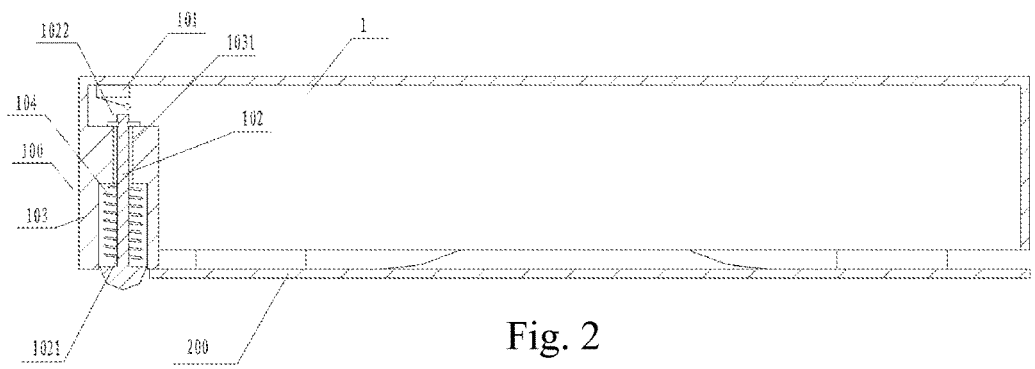
FIG. 2 is another structure diagram of the first embodiment of the present invention.

FIG. 2 is another structure diagram of the first embodiment of the present invention. As shown in FIG. 1 in combination with FIG. 2, in the embodiment, a glass-wiping device is provided, wherein the mutual coordination among the simple spring 104, the contact leg 1021 and the travel switch is adopted to realize the detection operation on the edge of the glass-wiping device. The specific detection and operation process of the glass-wiping device will be described in detail.

The external shape of the glass-wiping device in this embodiment is a square shape. In addition, four edge detection units 100 are included in this glass-wiping device and are respectively positioned on four corners of the glass-wiping device. The action element 102 is disposed in the step through-hole 1031 of the detection unit supporting body 103. The upper and lower ends of the step through-hole 1031 are opened, the shape of the step through-hole 1031 is provided corresponding to the shape of the action element 102 so as to limit the movement direction of the action element 102, and the contact leg 1021 is provided at the lower end of the action element 102. In this embodiment, the shape of the contact leg 1021 is a hemispheric shape. The spring 104 is fitted around the action element 102. As shown in FIG. 1, when the glass-wiping device is in a normal running state, the spring 104 is in a compressed state, the contact leg 1021 presses against the upper surface of the glass 200, and the top of the action element 102 presses aginst and contacts the travel switch, so that the travel switch is in a close state. As shown in FIG. 2, when the glass-wiping device reaches the edge of the surface of the glass having no frame, the contact leg 1021 leaves the surface of the glass 200. At this time, the spring 104 is released, the contact leg 1021 is pushed out from the step through-hole 1031 in the supporting body 103, the position-limiting part 1022 (i.e., the buckle) fixed on the upper part of action element 102 presses against the upper end step surface of the step through hole 1031, and at this time, the travel switch is disconnected. Upon the detection of this state, the control unit sends a "backward" instruction, and the glass-wiping device will immediately execute a backward operation. Under the guiding function of the hemispherical bottom surface, the contact leg 1021 is also forcibly pressed back into the step through-hole 1031, thus preventing the glass-wiping device from going beyond the surface of the glass 200 and falling off.

Second Embodiment

Figure 3:
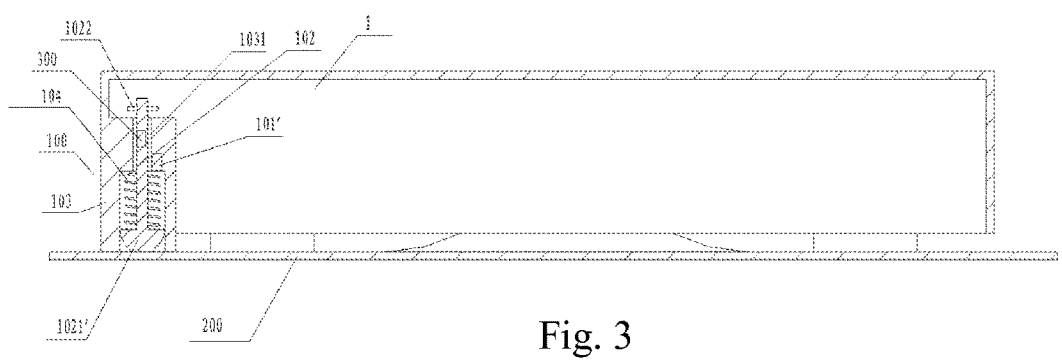
FIG. 3 is one structure diagram of the second embodiment of the present invention.

FIGS. 2 and 3 are two structure diagrams of the second embodiment of the present invention. As shown in FIG. 3 in combination with FIG. 4, in this embodiment, in order to improve sensitivity, the sensor switch 101' is a Hall sensor and is provided on the supporting body 103. The action element 102 comprises a magnetic element 300 correspondingly provided thereon. Alternatively, the sensor switch 101' is a magnetron, and the action element 102 comprises a magnetic element 300 correspondingly provided thereon.

Figure 4:
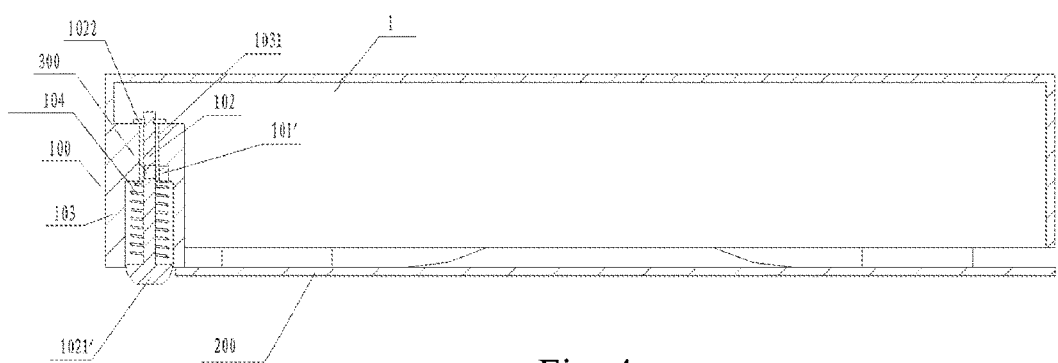
FIG. 4 is another structure diagram of the second embodiment of the present invention.

The external shape of the glass-wiping device in this embodiment is a circular shape, and includes four edge detection units 100 evenly provided on the circumference. The action element 102 is arranged in the step through-hole 1031 of the detection unit supporting body 103. The upper and lower ends of this step through-hole are opened. The shape of the step through-hole 1031 is provided corresponding to the shape of the action element 102, so as to limit the movement direction of the action element 102. The contact leg 1021' is provided at the lower end of the action element 102. In this embodiment, the contact leg 1021' has an arc shape. The spring 104 is fitted around the action element 102. As shown in FIG. 3, when the glass-wiping device is in a normal running state, the spring 104 is in a compressed state, the lower surface of the contact leg 1021' presses against the upper surface of the glass 200, the magnetic element 300 provided on the action element 102 and the Hall sensor or magnetron provided on the supporting body 103 are misaligned in position, and no feedback signal is generated. As shown in FIG. 4, when the glass-wiping device reaches the edge of the surface of glass having no frame, the contact leg 1021' leaves the surface of the glass 200. At this time, the spring 104 is released, the contact leg 1021' is pushed out from the step through-hole 1031 in the supporting body 103, the position-limiting part 1022 (i.e., the buckle) fixed on the upper part of the action element 102 presses against the upper end step surface of the step through-hole 1031. At this time, the magnetic element 300 provided on the action element 102 and the hall sensor or magnetron provided on the supporting body 103 are aligned in position, so that the Hall sensor or the magnetron generates an induction and provides a feedback signal to the control unit. The control unit sends a "backward" instruction, and the glass-wiping device will immediately execute a backward operation. Under the guiding function of the arc-shaped bottom surface of the contact leg 1021', the glass-wiping device will be forcibly pressed back into the step through-hole 1031, thus preventing the glass-wiping device from going beyond the surface of the glass 200 and falling off.

In conclusion, because of simplified structure, reduced costs and great controllability, the present invention can effectively realize the detection on the edge of a plate glass.

The invention claimed is:

1. A glass-wiping device comprising a machine body (1) and a control unit, characterized in that,
   the machine body (1) is provided with an edge detection unit (100) comprising a sensor switch (101, 101') and an action element (102), a contact leg (1021, 1021') is provided at a lower end of the action element (102) and presses against a surface of a glass (200), wherein the external shape of the machine body (1) is a square shape and the edge detection unit (100) is provided on a vertex angle of the machine body;
   when the contact leg (1021, 1021') leaves a surface of the glass (200), the action element (102) correspondingly generates a displacement and triggers the sensor switch (101, 101'),
   the sensor switch (101, 101') transmits a switch signal to the control unit, and based on the switch signal, the control unit controls the glass-wiping device to cease running or to change the running direction; and
   the contact leg (1021, 1021') has an end-surface shape that is a semi-circular or arc shape, and slides on the surface of the glass when the contact leg (1021, 1021') presses against the glass.

2. The glass-wiping device of claim 1, characterized in that,
   the sensor switch (101) is a travel switch, the action element (102) is a connecting rod;
   or, the sensor switch (101') is a Hall sensor, and the action element (102) comprises a magnetic element (300) correspondingly provided thereon; and
   or, the sensor switch (101') is a magnetron, and the action element (102) comprises a magnetic element (300) correspondingly provided thereon.

3. The glass-wiping device of claim 2, characterized in that,
   the edge detection unit (100) further comprises a supporting body (103) in which a step through-hole (1031) is provided,
   the action element (102) is provided through the step through-hole (1031), and has a length greater than the height of the supporting body (103),
   an upper part of the action element (102) is limited on an external end surface of the supporting body (103) by a position-limiting part (1022), and
   a spring (104) is fitted around the action element (102), and is pressed against between the step through hole (1031) and the contact leg (1021,1021').

4. The glass-wiping device of claim 3, characterized in that,
   the travel switch is provided within a shell of the glass-wiping device;
   or, the Hall sensor is provided on the supporting body (103); and
   or, the magnetron is provided on the supporting body (103).

5. The glass-wiping device of claim 3, characterized in that,
   the position-limiting part (1022) is a buckle fixed on the connecting rod.

6. The glass-wiping device of claim 3, characterized in that,
   the supporting body (103) and the shell on the edge of the machine body (1) are provided as an integral piece.

7. The glass-wiping device of claim 1, characterized in that,
   the machine body (1) has an external shape that is a circular, square, rectangle, oval or irregular shape.

8. The glass-wiping device of claim 1, characterized in that,
   the edge detection unit (100) is provided on an edge of the machine body.

9. The glass-wiping device of claim 1, characterized in that,
   a plurality of the edge detection units (100) are provided, the sensor switch (101,101') in each of the edge detection units (100) is connected to the control unit.

* * * * *